Dec. 28, 1948.  H. D. BRAILSFORD  2,457,637
ELECTRICAL MOTOR
Filed Aug. 17, 1945
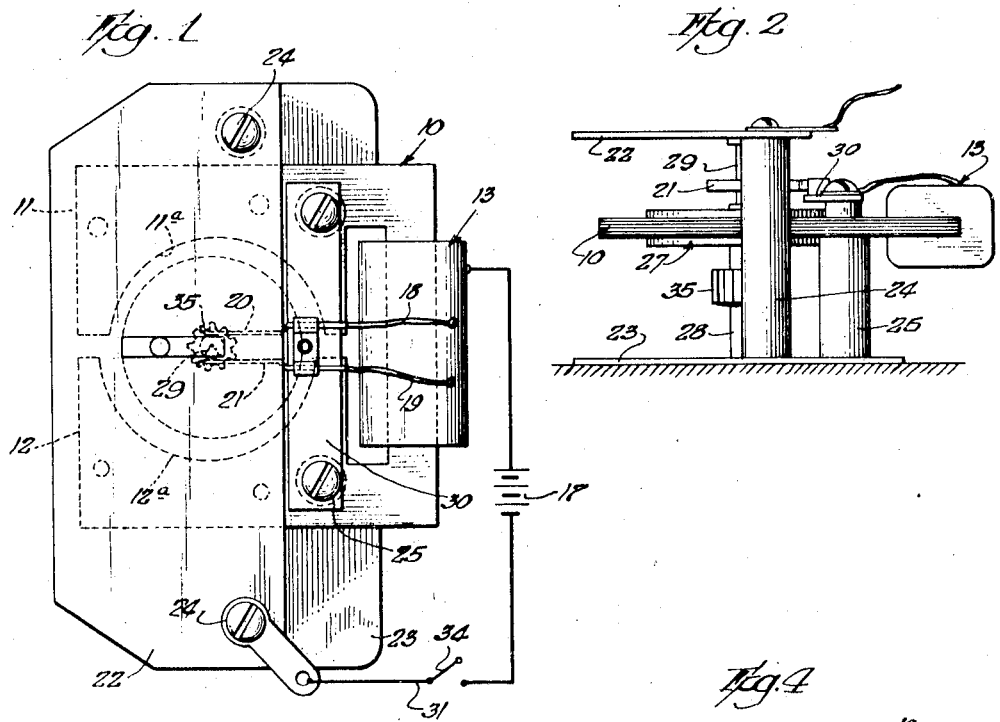
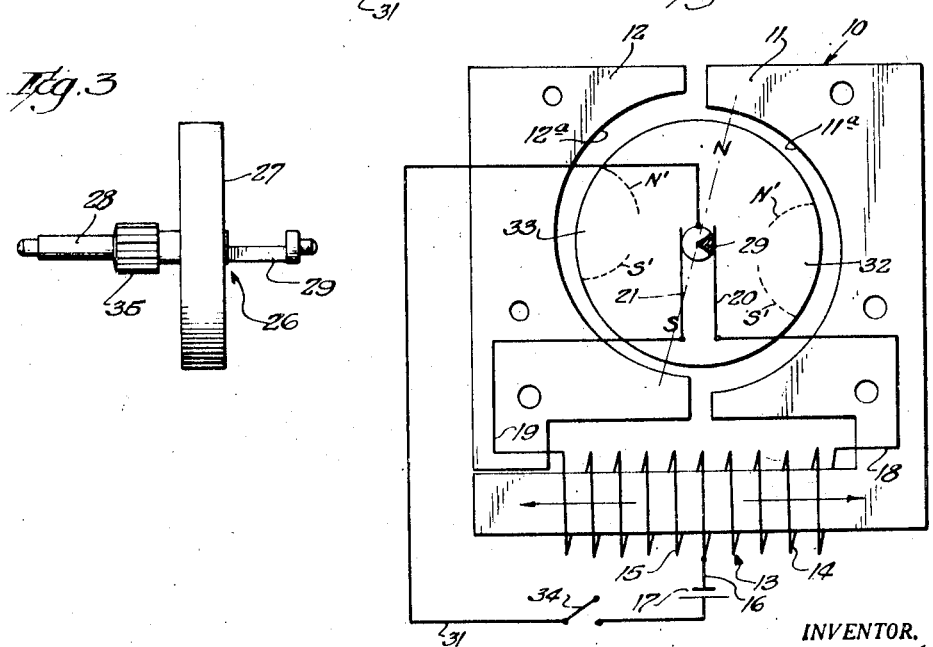
INVENTOR.
Harrison D. Brailsford
BY
Sheridan, Davis & Cargill
Attys.

Patented Dec. 28, 1948

2,457,637

UNITED STATES PATENT OFFICE 2,457,637

ELECTRICAL MOTOR

Harrison D. Brailsford, Harrison, N. Y.

Application August 17, 1945, Serial No. 611,066

7 Claims. (Cl. 172—36)

This invention relates to improvement in electrical motors.

One object of the invention is to provide an improved, self-starting, direct current motor adapted to be operated by the current from a low voltage source, such as a battery or dry cells, for example.

Another object of the invention is to provide a light weight motor of simple design having a disc like rotor that is premanently magnetized to provide a pair of diametrically opposite poles and an intermediate opposite pair of substantially non-magnetized areas all of which cooperate with electro-magnetic field poles to effect rotation of the rotor and to produce substantial starting torque relative to the current value.

Another object of the invention is to provide a self-starting motor comprising a permanently magnetized rotor having a pair of oppositely magnetized poles and a field having polarity reversible pole pieces, the arrangement being such that the rotor tends to come to rest with the axis of the permanently magnetized poles in one of two given positions wherein the maximum starting torque is exerted upon re-energization of the field coils and whereby the rotor always operates in one direction.

Other objects of the invention relate to various features of construction and arrangement of parts which will be apparent from a consideration of the following specification and accompanying drawings wherein:

Fig. 1 is a partially diagrammatical top plan view of an electrical motor illustrative of the present improvements.

Fig. 2 is a side elevation of the motor structure shown in Fig. 1.

Fig. 3 is a side elevation of the rotor wherein the armature shaft and armature is shown in detached relation.

Fig. 4 is a top plan view of the field pieces and rotor with the rotor supports removed and showing the motor circuit diagrammatically.

In the drawings, the structure shown for illustrative purposes comprises a laminated field core 10 having two pole pieces 11 and 12 and a winding 13. The winding comprises, in effect, two field coils 14 and 15 shown as having a common center tap 16 for connection to a source of direct current such as a battery 17 (see Fig. 4). The other ends of the coils 14 and 15 are connected by conductors 18 and 19 respectively to flexible conductive contact strips or brushes 20 and 21 which are positioned intermediate upper and lower frame members 22 and 23 shown in Figs. 1 and 2. The frame members in the structure illustrated, are held in spaced relation by posts 24 while the core 10 is supported by posts 25 secured to the base 23. A rotor 26, comprises a disc shaped armature 27, mounted on a shaft 28. The shaft is journalled at the upper and lower ends in the corresponding frame members 22 and 23.

The shaft 28 is provided with an eccentric contact portion 29 formed as by removing a portion of the shaft, the eccentric being located in the assembled motor between the free end portions of the brushes 20 and 21. The contact members 20 and 21 are suitably insulated from each other and are supported on a plate 30 carried by posts 25 and are so spaced apart that the ecentric 29 makes contact with said members alternately during the rotation of the rotor. The arcuate extent of the ecentric shown is such that upon contact of the eccentric with a strip, the contacting relation is maintained through approximately an arc of rotation of the rotor of 100°. Such range of contact has been found desirable in the motor structure specifically illustrated in the drawings, but as will be appreciated, the range may be increased or decreased as may be desired in special instances.

The shaft 28 of the rotor is conductive and makes electrical contact with the motor frame which by means of lead 31 is connected to the other terminal of the battery 17. The electrical circuit from the battery, as shown in Fig. 4 is through the center tap 16 of the winding, one of the coils 14 or 15, leads 18 or 19, to the flexible brush or contact strips 20 or 21; thence through the rotor shaft 28 to the motor frame and from the latter by conductor 31 to the other terminal of the battery. Since the eccentric 29 in the specific structure illustrated is designed to make contact with the strip 20 during an arc of rotation of the rotor of approximately 100°, the field circuit will be closed through coil 14 during approximately 100° of arc of rotation. When the coil 14 is energized, the polarity of the field poles will be of opposite sign. When the rotor has moved approximately 180° from the position shown in Fig. 4 the eccentric contact 29 will close the field circuit through flexible commutator strip 21 and hence through field coil 15 which, due to the direction of current therethrough, will produce polarity of the field poles of signs opposite the signs induced therein upon the energization of coil 14. Hence it will be seen that the polarity of the field poles is reversed during each half cycle of the rotor.

The rotor 26 being of disc form functions as a flywheel and is formed preferably of highly magnetizable material such as "Alnico" and is permanently magnetized in a diametrical band to provide magnetic poles at the armature periphery, the poles being marked N and S in Fig. 4 for identification. The magnetic effect of the poles is strongest at the two indicated pole portions but the magnetism spreads out with decreasing strength from each polar region toward areas indicated generally, rather than with precision, by boundary lines N' and S'. Between the indicated boundaries of the N and S poles of the armature are areas that are not permanently magnetized or at least not appreciably magnetized. These areas or regions are indicated by numerals 32 and 33 in Fig. 4.

As indicated in Fig. 4 the field poles 11 and 12 are provided with pole faces 11ᵃ and 12ᵃ respectively which are eccentric with respect to the axis of rotation of the rotor. The poles faces are spaced from the armature periphery distances that decrease in a counter-clockwise direction as viewed in Fig. 4. The rotor of the motor illustrated is irreversible and always operates in a counter-clockwise direction only as viewed in said figure.

The magnetization of the armature as described above provides a relatively strong starting torque when one of the field coils is energized by reason of the arrangement shown, all the magnetic and electro-magnetic forces acting on the armature throughout its periphery tend to produce rotation in counter-clockwise direction as viewed in Fig. 4. Also by reason of the permanent rotor poles referred to, the armature comes to rest upon the opening of the field circuit in the position shown in Fig. 4, or in a position 180° removed therefrom, in either of which positions the maximum rotative forces are exerted on the armature when the field circuit is again closed.

Referring to Fig. 4 the magnetic poles of the armature are shown in a position corresponding to the shortest magnetic path between diametrical portions of the pole faces 11ᵃ and 12ᵃ. The eccentric 29 is in contact with commutator strip 20. Upon the closing of the field circuit, as by means of a switch 32, the coil 14 will be energized and, let it be assumed that field pole 11 will be north and the field pole 12 will be south. The north field pole 11 will, at its upper portion as viewed in Fig. 4, repel the N pole of the armature in a counter-clockwise direction while the south field pole 12 at its lower portion, will repel the S pole of the armature also in a counter-clockwise direction. Concurrently with the repelling action of each field pole on the armature poles of like polarity, the upper portion of the south field pole 12 will attract the N pole of the armature while the lower portion of the north field pole 11 will attract the S pole of the armature, these forces acting in a direction to produce counter-clockwise rotation of the rotor. A relatively large torque is thereby provided at starting.

When the eccentric 29, as viewed in Fig. 4, is moved through an arc of approximately 100° from the position therein shown, the field circuit is broken by separation of the eccentric 29 from the commutator strip 20, and the field poles thereupon become non-magnetic. However, the permanent magnetic poles of the armature, due to the attraction of the same to the faces of the field poles, continue to exert rotative force on the rotor since they tend to move progressively in a counter-clockwise direction by reason of the decreasing air gap between the permanent magnetic poles of the rotor and the faces of the field poles. The rotor will tend to come to rest in the position wherein the rotor poles occupy the shortest magnetic path between the field poles or approximately 180° from the respective positions of the rotor poles shown in Fig. 4. However, as the rotor advances through approximately 180° of arc from the position shown in Fig. 4, the eccentric contact 29 will make contact with the other brush strip 21 and thereby effect energization of the coil 15 which re-energizes the field poles but with polarity the reverse of that of the previous energization. Hence field pole 11 will be south and pole 12 will be north and they will cooperate as described above each to repel the rotor pole of like polarity and to attract the rotor pole of unlike polarity. After a further rotation of approximately 100°, the field poles will again be de-energized by the movement of the eccentric 29 out of contact with brush 21. Rotative force for the next 80° or thereabout is supplied by the attractive force existing between the permanent rotor poles and the non-magnetized field pole faces through the gap that constantly decreases in the direction of the rotation of the rotor. When the rotor arrives at the position shown in Fig. 4, the eccentric 29 will again make contact with brush 20 and the field will again be energized, the pole 11 being north and pole 12 being south, as above described, during the succeeding 100° of arc of rotation of the rotor.

The mutual attractive and repulsion forces that occur between the permanent rotor poles and the reversible field poles during intervals of field energization are not the only forces that produce rotation of the rotor, since the non-permanently magnetized areas 32 and 33 of the rotor also contribute to the total desired rotative force. It will be seen that during any interval that the field poles are energized, one north and the other south each will attract one of the normally non-magnetized areas 32, 33 of the rotor, which attractive forces, by reason of the decreasing air gap between said areas and the respective field poles, adds to the rotative effect of the field on the rotor. Hence, at starting not only does each field pole attract one permanent rotor pole and repel the other but by electro-magnetic attraction each field pole attracts the non-permanently magnetized area adjacent its face, all contributing to the total rotation effect. Hence the improved motor displays substantial starting torque which is always exerted in one direction. In the particular arrangement of parts shown in the drawings of the present illustrative embodiment of the invention the direction is counter-clockwise as viewed in Fig. 4.

Due to the arrangement whereby the rotor, upon the opening of a contact switch 34, moves into the position wherein the permanent magnetic axis of the rotor occupies the position shown in Fig. 4 or a position removed 180° therefrom, with the eccentric 29 in contact with the strip 20 or 21 respectively, the motor is always in condition to exert its maximum rotative effort upon reclosing of the switch. As mentioned above, the direction of rotation and of self-starting is counter-clockwise when the motor is connected to the battery as shown in Fig. 4, but by reversing the polarity of the battery connections to the field circuit, the motor will operate clockwise although in that instance it will not be self-starting.

In Fig. 3 of the drawing the rotor shaft 28 is shown provided with a pinion 35 which is merely illustrative of any suitable element for power take-off purposes.

While I have shown and described a specific embodiment of the improvements, it will be apparent that changes in the details of the illustrated arrangements may be resorted to without departure from the spirit of the invention.

I claim:

1. A self-starting direct current electrical motor comprising a disc shaped rotor of magnetic material provided with a permanently magnetized diametrical zone providing peripherally located poles of opposite sign and non-magnetized zones intermediate the magnetic poles at opposite peripheral portions of the rotor, an electro-magnetic field comprising a winding and pole pieces each decreasingly spaced from the periphery of the rotor in the direction of rotation of the latter whereby the rotor tends to move by magnetic attraction between the field poles and the rotor poles during intervals of non-energization of the winding, and current control means for said field winding driven by said rotor, for effecting alternate energization and deenergization thereof and reversal of polarity of the field poles during each rotation of the rotor whereby during energization of the winding the field poles produce alternate repulsive and attractive forces on the rotor poles and attractive forces on the non-magnetized zones of the latter in directions to effect rotation of the rotor in one direction.

2. A self-starting direct current electrical motor comprising an electro-magnetic field having a pair of field poles and a pair of windings alternately energizable for effecting reversal of polarity of the field poles, a rotor positioned between said field poles and within the magnetic field thereof, said rotor being of magnetic material in disc form and being permanently magnetized along a diameter thereof to provide permanent north and south poles, said field poles having arcuate pole faces positioned adjacent the periphery of the rotor and spaced therefrom to provide air gaps which decrease in width in the direction of rotation of the rotor, means operable by the rotor for supplying energizing current to the winding in opposite directions for effecting reversal of polarity of said field poles during portions of each cycle of rotation of the rotor for producing both attractive and repelling forces which act on said rotor poles during each energization of the winding to produce rotation of said rotor.

3. A self-starting direct current electric motor comprising an electro-magnetic field having a pair of field poles and a winding adapted to be energized intermittently by current flowing in directions for effecting reversal of polarity of said poles in timed relation with respect to the movements of a rotor, a disc shaped rotor of magnetic material positioned between said field poles, said field poles having arcuate pole faces each eccentric with respect to the motor axis to provide air gaps each decreasing in width with respect to the direction of the rotation of the rotor, said rotor having a permanently magnetized diametrical zone providing a pair of magnetic poles of opposite sign whereby during intervals of non-energization of said winding said rotor tends to move to a position wherein the rotor poles occupy the shortest magnetic path with respect to the eccentric faces of said field poles, said rotor having a pair of relatively non-magnetized areas in opposite portions thereof each positioned between said field poles, and means driven by said rotor for supplying energizing current to said winding intermittently and in directions for effecting reversal of polarity of said field poles whereby during intervals of energization of said winding said magnetic poles of said rotor are initially repelled by one of said field poles and attracted by the other and said non-magnetized zones are attracted by said field poles for contributing rotative force to the rotor.

4. A self-starting direct current electrical motor comprising a magnetic field core providing a pair of field poles and having alternately energizable field coils each adapted to be connected electrically to one terminal of a source of current for effecting reversal of polarity of the field poles, said poles having arcuate faces arranged to provide a decreasing air gap with respect to the periphery of an interposed disc shaped rotor, a rotor of disc form and of magnetic material disposed between said pole faces and having a permanently magnetized zone arranged diametrically thereof and providing opposed poles of opposite sign, an eccentric operable by the rotor adapted to be connected electrically to the other terminal of said source, and a pair of contact members each connected electrically to one of said coils and arranged for alternate energization of the respective coils whereby each of said rotor poles is attracted by one field pole and repelled by the other field pole simultaneously during portions of each arc of rotation of 180° of the rotor.

5. A self-starting direct current electric motor comprising a magnetic field core providing a pair of field poles and having a winding intermittently energizable to provide alternating polarity of the field poles, a rotor of disc form disposed between said poles and having a permanently magnetized diametrical zone providing peripheral poles of opposite sign, said field poles having faces provided with respectively juxtaposed end portions and intermediate portions progressively spaced from the rotor periphery in the direction of rotation of the latter whereby upon de-energization of said field the poles of the rotor tend to come to rest in positions each adjacent a pair of justaposed end portions of said field poles whereby each pole of the rotor will be repelled by one field pole and attracted by the other field pole to provide high starting torque upon re-energization of the winding, and means cooperable with said rotor for effecting reversal of sign of said field poles during each rotation of the rotor through an arc of 180°.

6. A self-starting direct current electric motor comprising upper and lower frame plates, means supporting the plates in spaced relation, an armature comprising a disc shaped rotor disposed between said plates and having a shaft journalled at the ends in said plates, a field comprising a magnetic core supported between said plates in the plane of said rotor and provided with a pair of field poles having faces of arcuate form substantially surounding the periphery of said rotor and terminating in end portions arranged in juxtaposed pairs at diametrically opposed portions of said faces, one end portion of each pole face being disposed closer to the periphery of the rotor than the other end portion of the respective pairs to provide a shortened magnetic path between the pole faces diametrically of the rotor, a pair of brush contacts electrically connected to said winding, contact means on said rotor shaft aranged to effect alternate contact with said brush contacts during the rotation of the rotor for altering the direction of current flow in said winding from a current source, a switch for effecting the starting and stopping of the motor, and diametrically opposite permanent poles of opposite sign provided in said rotor whereby upon opening said switch said rotor poles exert rotative effects by magnetic attraction with respect to adjacent pole faces for moving the motor to a position of rest wherein said rotor poles are aligned within said shortened magnetic path and whereby upon reclosing of said switch each pair of said end portions of the field poles cooperate to provide both attractive and repelling forces that act on the adjacent rotor poles in one rotative direction for starting the rotor.

7. A self-starting direct current electrical motor comprising a magnetic field core providing a pair of field poles and having alternately energizable field coils each adapted to be connected electrically to one terminal of a source of current for effecting reversal of polarity of the field poles, one end portion of each pole face being disposed closer to the periphery of an interposed disc-shaped rotor to provide a shortened magnetic path between the pole faces diametrically of the rotor, said rotor being of magnetic material disposed between said pole faces and having a permanently magnetized zone arranged diametrically thereof and providing opposed poles of opposite sign, an eccentric operable by the rotor adapted to be connected electrically to the other terminal of said source, and a pair of contact members each connected electrically to one of said coils and arranged for alternate contact with said eccentric for effecting the alternate energization of the respective coils whereby each of said rotor poles is attracted by one field pole and repelled by the other field pole simultaneously during portions of each arc of rotation of 180° of the rotor.

H. D. BRAILSFORD.

REFERENCES CITED

The following references are of record in the file of this patent:

UNITED STATES PATENTS

| Number | Name | Date |
|---|---|---|
| 362,322 | Sheehy | May 3, 1887 |
| 1,367,982 | Lidseen | Feb. 8, 1921 |
| 2,185,990 | Schurch | Jan. 2, 1940 |
| 2,214,850 | Arey | Sept. 17, 1940 |